UNITED STATES PATENT OFFICE.

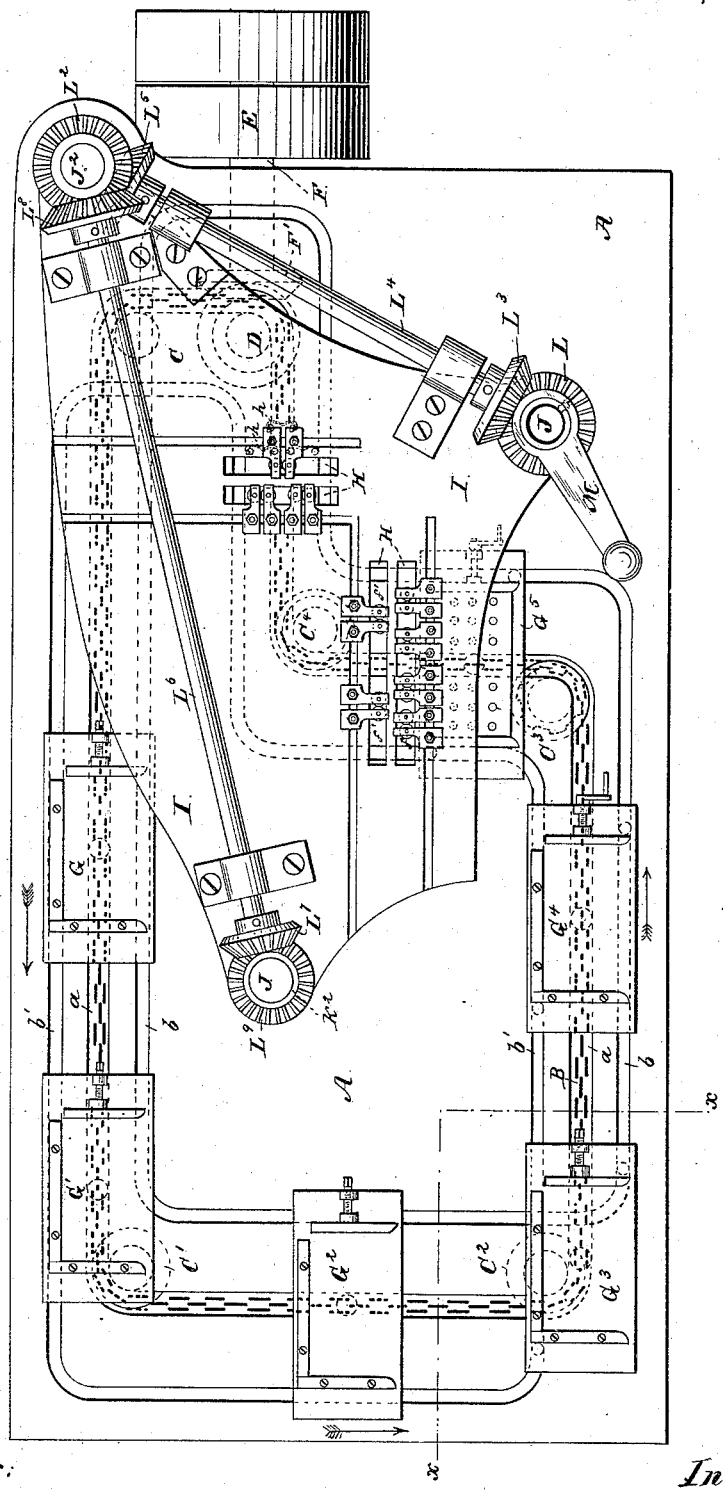

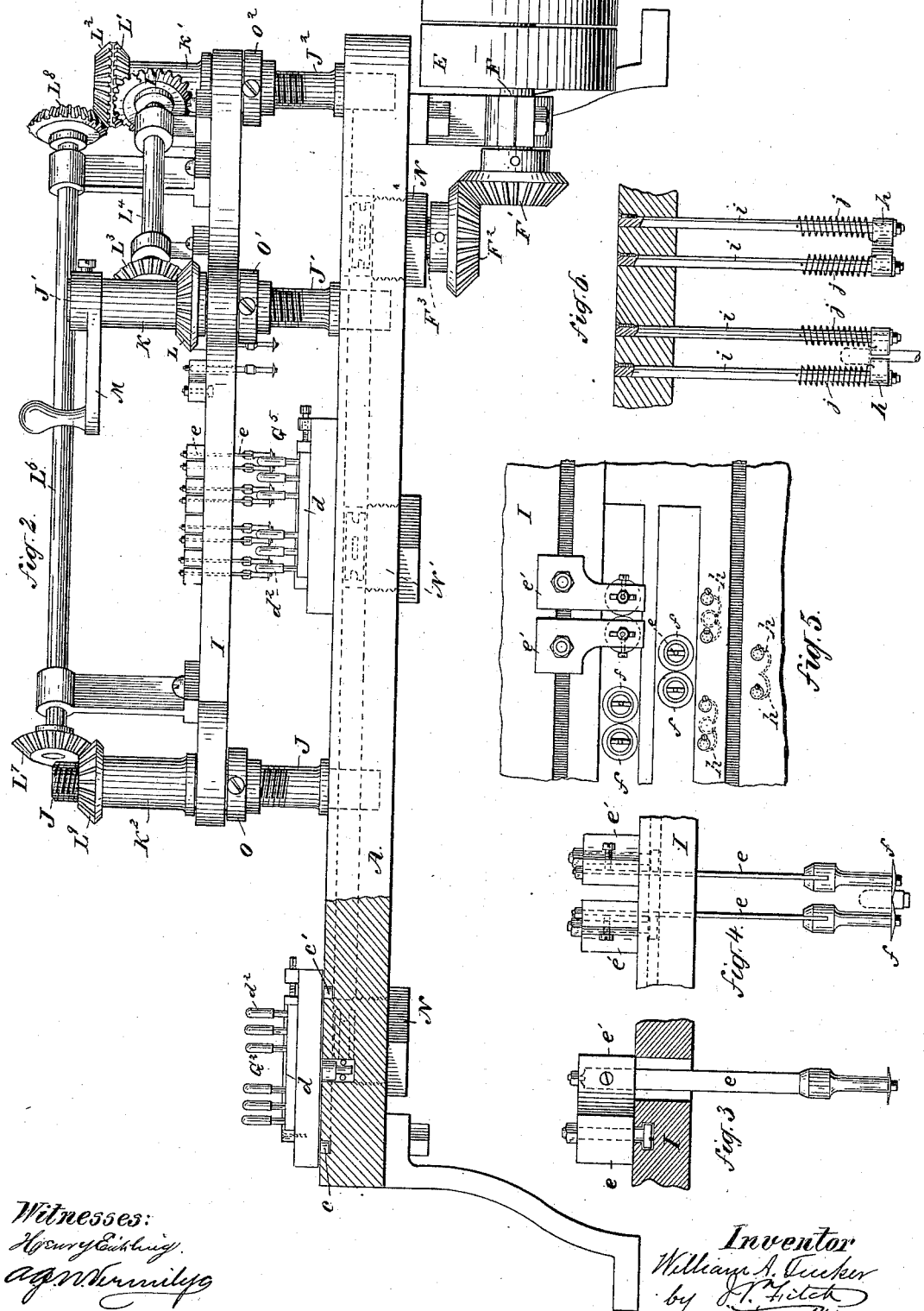

WILLIAM A. TUCKER, OF NEW YORK, N. Y.

CAPSULE-CUTTING MACHINE.

SPECIFICATION forming part of Letters Patent No. 313,132, dated March 3, 1885.

Application filed April 16, 1884. (No model.)

*To all whom it may concern:*

Be it known that I, WILLIAM A. TUCKER, of the city of New York, and the county and State of New York, have invented a new and Improved Capsule-Cutting Machine, of which the following is a specification, reference being had to the accompanying drawings, forming part of the same, in which—

Figure 1 is a plan view of my invention. Fig. 2 is a side elevation of the same. Figs. 3 to 6, inclusive, are detailed views to be described.

The working parts of my machine are supported upon a suitable platform or table, A. Upon this platform is mounted an endless chain or belt to run in a horizontal plane over pulleys, as represented in Fig. 1. B is the said chain, and C, C', $C^2$, $C^3$, and $C^4$ are the pulleys over which it runs, together with the driving-pulley D, the latter being provided with sprockets that take into the chain. Motion is communicated to the said sprocket-wheel D from the driving-pulley E on the main driving-shaft F through the gears F' $F^2$ and shaft $F^3$, as will be seen by Fig. 2. The said chain by moving over these pulleys takes a devious way around the table. Starting from the sprocket-wheel D, it runs around the pulley C; then at right angles along the table to the pulley C'; thence at right angles across the table to and around pulley $C^2$; thence parallel with the side of the table to and around pulley $C^3$; thence across the table to and around pulley $C^4$; thence along the table to wheel D.

Upon the chain B are mounted a series of plate-holders, G G' $G^2$ $G^3$ $G^4$ $G^5$. These plates are fastened at their centers to the said chain, which runs in a groove, *a*, in the face of the table A. The said table is also provided with two other grooves, *b b'*, and from the under faces of the diagonally-opposite corners of the said plate-holders G are pins which project into the said grooves, respectively, *b b'*, as seen at *c c'*. Now, when motion is communicated to the said chain from the sprocket-wheel D in the direction of the said wheel to the pulley C, and around that to the left, the said plate-holders are carried by the chain around the table, with their sides always parallel to the sides of the table, or to the grooves *a b b'* along the sides of the table, the described pins in the said plates, in traversing the grooves *b b'*, operating to secure such parallelism. The plates carrying the capsule-molds (shown at $d^2$) are placed and secured upon the upper faces of the carrier-plates G, and so travel with them. These are provided with two series of cutters, one shown at H and the other at H', Fig. 1. The first series are designed to operate upon the molds as they are carried between the pulleys $C^3$ $C^4$, and the other to operate upon them while passing from $C^4$ to D. These cutters are secured to the lower end of the spring-arms *e*, as shown in Figs. 2, 3, and 4, the upper ends of the said arms being fixed in head-blocks *e'* on a plate, I, supported on pillars above the upper face of the table A. Two of these cutters are provided to operate upon each capsule-mold, as seen in Figs. 2 and 4; and the molds, as they are carried around on the carrier-plates G', respectively, pass between two cutters, thus cutting the capsule on the mold on two sides, and nearly one-half around the capsule on each side. In series H these cutters are arranged, as shown in Fig. 1, so that the molds intermediate the two molds which pass between the cutters and are operated upon, pass through without being cut, and then are themselves operated upon by the cutters *f' f'*, the arrangement being such that all the molds in the plate, as it passes under these cutters, shall be acted upon by the cutters. Then the molds, while moving from pulley $C^4$ to wheel D, passing between the cutters H', are acted upon so as to cut the capsules upon the sides remaining uncut by the series of cutters H', so that when the molds are passed through all these cutters the capsules thereon will be cut and trimmed around their entire bodies.

To remove the scrap from the mold after the cutting operation is performed, scrapers are provided, which are represented on Fig. 6, and appear in dotted lines at *h*, Fig. 1. Each of the scrapers consists of two strips of metal, *g*, looped at one end onto the ends of shafts *i*, Fig. 6, with the free end of the strip curved, as shown in dotted lines in Fig. 5, so that the ends will come together. On each shaft $i$ is a spiral spring, $j$, connected with the scrapers, so as to hold the ends of the scrapers in contact. After the capsules on the molds have passed between the knives, and the capsules have thereby been cut, they then pass between these scrapers, the scrapers being arranged to make contact with the molds just below the capsule and with the scrap on the molds, so that in passing between the scrapers the scrap is entirely removed from the mold. The arrangement of these scrapers in series is similar to the arrangement of the cutters, so that the molds, in passing between them, will all be operated upon by the scrapers and the scrap from the molds removed.

Provision is made for the adjusting of the cutters to the molds by means of nuts on the threaded upper ends of the arm $e$, which are held in the head-block $e'$ on the plate I.

Provision is also made for raising and lowering the cutters in the operation of cutting, as is required by means of the shaft and gear represented. The plate I is supported on pillars J J' J². These pillars have screw-threads cut on them from their upper end nearly down to the table A, and on them are fitted sleeves K K' K², which have cut in them female screw-threads to work in the screw-threads on the pillars. These sleeves pass through holes in the plate I. There are on the sleeves shoulders above the plate, and collars secured to the sleeves at their lower ends under the plate I, so that when the said sleeves are raised or lowered they will carry the plate I and the parts mounted thereon up and down.

On the sleeve K is a bevel-gear, L, secured thereto just above the plate I, and on the sleeve K' there is a bevel-gear, L', near its upper end; also on K' is a bevel-gear, L², at its upper end. On the upper end of sleeve K is a crank-handle, M, by which motion is communicated from the bevel-gear L through the gear L³, shaft L⁴, gear L⁵ L' on sleeve K', thence through gear L⁸, gear L², shaft L⁶, gear L⁷ L⁹ to sleeve K². By this arrangement the plate I may be raised and lowered by the rotation of the sleeve K by means of the crank-handle M.

For convenience in construction, openings are drilled in the lower face of the table A, but not quite through the table, so that the upper surface of the table is left entire. Into these openings the sprocket-wheel and pulleys described are inserted for the chain B to run upon, and then the screw-plugs N N' N² are secured into the said openings, the same being provided with projections or short shafts at their upper ends upon which the said pulleys and sprocket-wheel are journaled.

In putting together the described parts that are supported by pillars J J' J², the collars O O' O² are dropped down on the pillars, and then plate I is placed upon the pillars which pass through the openings in the said plate, and the described sleeves are then screwed down onto the pillars until the shoulders on them meet the said plate I. Then the collars are slipped up to the ends of the sleeves and secured thereon, as shown in Fig. 2.

What I claim as my invention, and desire Letters Patent for, is—

1. In a capsule-cutting machine, the combination, with an endless chain, of one or more molds suitable for forming capsules, mounted upon and detachably secured to said chain, as and for the purpose specified.

2. In a capsule-cutting machine, an endless carrying-chain swiveled thereto, one or more plates in which are secured suitable pins or molds for forming capsules, and the described driving-wheels and supporting-pulleys for giving movement and direction to said chain, the said plates being severally provided with two steady-pins projecting from their under faces at diagonally-opposite corners into the groove $b$ in the table A, whereby the said plates are caused to move around the said table in different directions, and yet with their sides constantly parallel with the sides of the table, as and for the purpose described.

3. In a capsule-cutting machine, the combination, with the described capsule molds and cutters, of the described spring-scrapers $h$, located relatively to the said molds and cutters, as described, so that the molds, after passing between the cutters, pass between the springs, forming severally the scrapers whereby the scrap severed from the capsules by the cutters is removed sidewise from the molds by the said spring-scrapers.

4. In a capsule-cutting machine, the combination of the described capsule molds and cutters with the movable plate I, carrying said cutters, the described sleeves, shafts, and gears mounted on pillars J J' J², as shown and described, whereby the said cutters may be vertically adjusted to cut capsules of different lengths.

WILLIAM A. TUCKER.

Witnesses:
  A. G. N. VERMILYA,
  C. W. BENJAMIN.